J. H. MEYER.
GEARING.
APPLICATION FILED JULY 25, 1913.
1,168,533.
Patented Jan. 18, 1916.
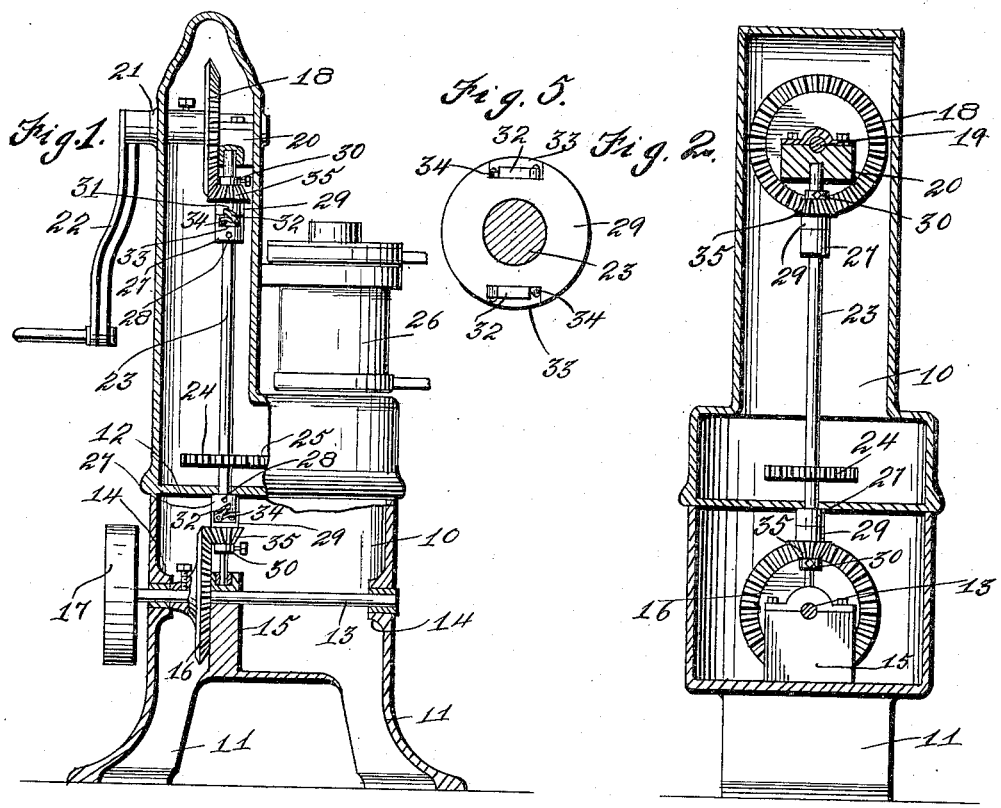
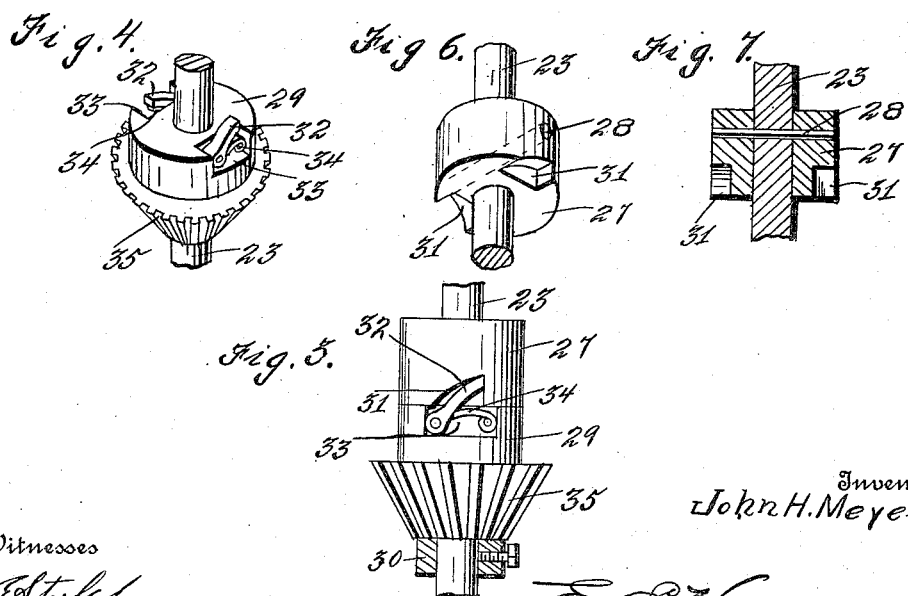
Witnesses
Inventor
John H. Meyer
By E. E. Vrooman
his Attorney.

UNITED STATES PATENT OFFICE.

JOHN H. MEYER, OF SHERMAN, SOUTH DAKOTA.

GEARING.

1,168,533.   Specification of Letters Patent.   Patented Jan. 18, 1916.

Application filed July 25, 1913. Serial No. 781,227.

*To all whom it may concern:*

Be it known that I, JOHN H. MEYER, a citizen of the United States, residing at Sherman, in the county of Minnehaha and State of South Dakota, have invented certain new and useful Improvements in Gearing, of which the following is a specification, reference being had therein to the accompanying drawing.

This invention relates to an improvement in the operating mechanism for a cream separator and the principal object of the invention is to so construct the operating mechanism that it may be operated by a belt drive or by a hand crank.

Another object of the invention is to so construct the operating mechanism that the hand crank and belt drive may be operated without turning the one which is not being used.

Another object of the invention is to provide an improved type of clutch for permitting the independent motion of the belt drive and hand driven device.

With these and other objects in view this invention consists of certain novel combinations, constructions and arrangements of parts as will be hereinafter fully described and claimed.

This invention is illustrated in the accompanying drawing, wherein:

Figure 1 is a view showing the casing in vertical section to show the manner of mounting the interior operating mechanism. Fig. 2 is a section taken at right angles of that shown in Fig. 1. Fig. 3 is an enlarged side elevation of the clutch at the lower end of the vertical shaft. Fig. 4 is a perspective view of the lower section of the clutch shown in Fig. 3. Fig. 5 is a top plan view of the clutch shown in Fig. 4. Fig. 6 is a perspective view of the upper section of the clutch shown in Fig. 3. Fig. 7 is a view of the clutch section shown in Fig. 6.

This invention comprises a casing 10 provided with the supporting feet 11 and divided into upper and lower chambers by means of the horizontal partition 12. A horizontal driving shaft 13 is mounted in the lower compartment with its end portions passing through the bearings 14, and its central portion passing through the supporting block 15. A beveled gear wheel 16 is mounted upon the shaft 13 between the block 15 and one of the bearings 14, and a pulley wheel 17 is mounted upon the upper end portion of the shaft 13 so that a driving belt may be used to turn the shaft 13.

A second beveled gear wheel 18 is mounted upon a shaft 19 supported by the block 20 and bearing 21. This shaft 19 is rotatably mounted and has one end extending through the casing 10 so that a handle 22 may be connected with the shaft 19, thus permitting the gear 18 to be rotated by manual power. A vertical driving shaft 23 extends through the upper and lower chambers of the casing and has its ends journaled in the blocks 15 and 20, as clearly shown in Fig. 1. This driving shaft carries a gear 24 meshing with the gear 25 of the supporting mechanism mounted in the housing 26. This mechanism is of the kind usually used in rotary separators, and since it does not form part of this invention it is not necessary to illustrate the same.

Upper and lower clutches are carried by the vertical shaft 23 and are so constructed that the upper one will operate when the handle 22 is rotated, and the lower one will operate when the shaft 13 is rotated. These clutches are constructed in a similar manner and therefore a description of one is sufficient for both. Each of these clutches comprise a stationary member 27 which is held in rigid connection with the shaft 23 by means of the pin 28 and the rotary member 29 which is freely rotated upon the shaft held in a desired position by means of the collar 30. The stationary member 27 is provided with a plurality of pockets 31 sloping from the face of the stationary member and terminating in abutment faces so that the pawls 32 which are pivotally mounted within the pockets 33 of the rotary member may normally engage the abutment wall of the pockets 31, thus causing the shaft to rotate when the rotary member is turned in the proper direction. The springs 34 yieldably hold pawls in the position shown in Fig. 3, but permit the pawls to ride out of the pockets when the rotary member is turned to the left in Fig. 3, without causing the shaft 23 to rotate. From an inspection of Fig. 1, it will be seen that the pawls in the upper and lower clutches face in opposite directions, thus causing the shaft 23 to be turned in the same direction when either the handle 22 or the shaft 13 are rotated without both of the operating means turning at once. Beveled gear wheels 35 are carried by the rotary members and mesh with the gear wheels 16 and 18 so that rotary motion will be transmitted to the shaft 23.

In the operation of this device the operating mechanism is assembled as shown in Fig. 1, and may be operated by the handle 22 or by means of the belt passing around the pulley wheel 17. If the handle 22 is turned the gear wheel 18 will rotate the rotary section of the upper clutch, thus causing the shaft 23 to be turned toward the right of this figure, and transmit motion from the gear 24 to the supporting mechanism. While the handle 22 is being turned the stationary member of the lower clutch will turn away from the pivoted end of the clutch in the rotary member of the lower clutch, thus preventing the rotary member from turning with the stationary member. If the machine is to be operated by the belt drive, the belt is placed around the wheel 17 and when the shaft rotates the gear wheel 16 will cause the rotary member of the clutch to turn toward the right in Fig. 1 and turn the shaft 23 in the same direction in which it turned when the handle 23 was turned. When the shaft 13 is rotated the pawls of the upper clutch will slide out of the pockets of the rotary member without turning the rotary member.

An operating mechanism for a separator has thus been provided which will allow the separator to be operated either by manual operation or by a belt drive without the two moving at the same time.

What is claimed, is:—

In a device of the class described, the combination with a supporting body, and a shaft rotatably carried by said body, clutches carried by said shaft adjacent each end thereof, each clutch comprising a fixedly secured member and a rotary member, each of said rotary members provided with a beveled gear, pawls carried by said rotary members and adapted to engage said fixed members, means engaging said beveled gears for rotating the same, the pawls of said rotary members extending in opposite directions.

In testimony whereof I hereunto affix my signature in presence of two witnesses.

JOHN H. MEYER.

Witnesses:
JOHN M. MOON,
WALTER SIMONS.

Copies of this patent may be obtained for five cents each, by addressing the "Commissioner of Patents. Washington, D. C."